(12) United States Patent
Yang et al.

(10) Patent No.: US 8,925,180 B2
(45) Date of Patent: Jan. 6, 2015

(54) PROCESSING MACHINE

(75) Inventors: Wen-Liang Yang, Taichung (TW); Hsin-Ying Lee, Taichung (TW)

(73) Assignee: Top Tech Machines Co., Ltd., Taichung (TW)

( * ) Notice: Subject to any disclaimer, the term of this patent is extended or adjusted under 35 U.S.C. 154(b) by 514 days.

(21) Appl. No.: 13/413,345

(22) Filed: Mar. 6, 2012

(65) Prior Publication Data

US 2013/0232748 A1 Sep. 12, 2013

(51) Int. Cl.
*B23P 23/04* (2006.01)
*B22F 3/24* (2006.01)
*B24B 7/00* (2006.01)
*B23Q 39/00* (2006.01)

(52) U.S. Cl.
USPC ........... 29/563; 29/564; 29/56.5; 29/DIG. 31; 419/28; 451/67; 451/287

(58) Field of Classification Search
CPC ...................................................... B23P 23/04
USPC ......... 29/56.5, 564, 563, DIG. 31; 451/67, 73
See application file for complete search history.

(56) References Cited

U.S. PATENT DOCUMENTS

| 3,563,082 | A * | 2/1971 | Zapf ................................. 72/374 |
| 7,020,539 | B1 * | 3/2006 | Kovacevic et al. ............ 700/166 |
| 8,329,092 | B2 * | 12/2012 | Fuwa et al. ...................... 419/11 |
| 2009/0038139 | A1 * | 2/2009 | Kerschner et al. ............... 29/566 |
| 2014/0147328 | A1 * | 5/2014 | Abe et al. ........................ 419/28 |

FOREIGN PATENT DOCUMENTS

| JP | 58-155166 A | * | 9/1983 |
| JP | 2001-152204 A | * | 6/2001 |

* cited by examiner

Primary Examiner — Erica E Cadugan (57) ABSTRACT

A processing machine that combines the functions of mounting press and grinding for metallographic analysis and includes a main frame at least one shaft and a drive device horizontally mounted on the main frame. A mounting press unit and a grind unit are mounted on the main frame. The grind unit including a base secured on the main frame and linearly corresponds to the mounting press unit and the corresponding line parallel to the at least one shaft. The grind unit includes a headstock slidably mounted on the at least one shaft the and reciprocally moved on the at least one shaft to selectively align with the base of the grind unit and the mounting press unit when the drive device is operated. A control unit disposed in the grind unit for controlling the mounting press unit and the grind unit.

15 Claims, 8 Drawing Sheets

PROCESSING MACHINE

BACKGROUND OF THE INVENTION

1. Field of the Invention

The present invention relates to a processing machine, and more particularly to a processing machine that includes the functions of mounting press and grinding for metallographic analysis.

2. Description of Related Art

As usual, the operator must form multiple samples by mounting press before metallographic analysis. The samples are detached one after one after being shaped. Continually, the samples are ground on a grind machine one after one. However, the processes of forming the samples, detaching the samples and grind the samples one by one are complicated and take a lot of time and needs to be simplified.

The present invention has arisen to mitigate and/or obviate the disadvantages of the conventional processes for forming a sample and grinding the sample before metallographic analysis.

SUMMARY OF THE INVENTION

The main objective of the present invention is to provide an improved processing machine that includes the functions of mounting press and grinding for metallographic analysis.

To achieve the objective, the processing machine in accordance with the present invention comprises a main frame including two stands respectively mounted on two opposite ends thereof. At least one shaft and a drive device are horizontally mounted between the two stands. A mounting press unit is mounted on the main frame and a grind unit mounted on the main frame. The grind unit includes a base secured on the main frame. The grind unit linearly corresponds to the mounting press unit and the corresponding line is parallel to the at least one shaft. The grind unit includes a headstock slidably mounted on the at least one shaft and connected to the drive device such that the headstock is reciprocally moved on the at least one shaft to selectively align with the base of the grind unit and the mounting press unit when the drive device is operated. A control unit disposed in the grind unit, wherein the mounting press unit and the grind unit are respectively electrically connected to the control unit and controlled by the control unit.

The processing machine in accordance with the present invention combines the functions of mounting press and grinding such that the previous operations of metallographic analysis are greatly simplified and the operator does not needs to guard processing machine in accordance with the present invention.

Further benefits and advantages of the present invention will become apparent after a careful reading of the detailed description with appropriate reference to the accompanying drawings.

DETAILED DESCRIPTION OF THE INVENTION

Figure 1:
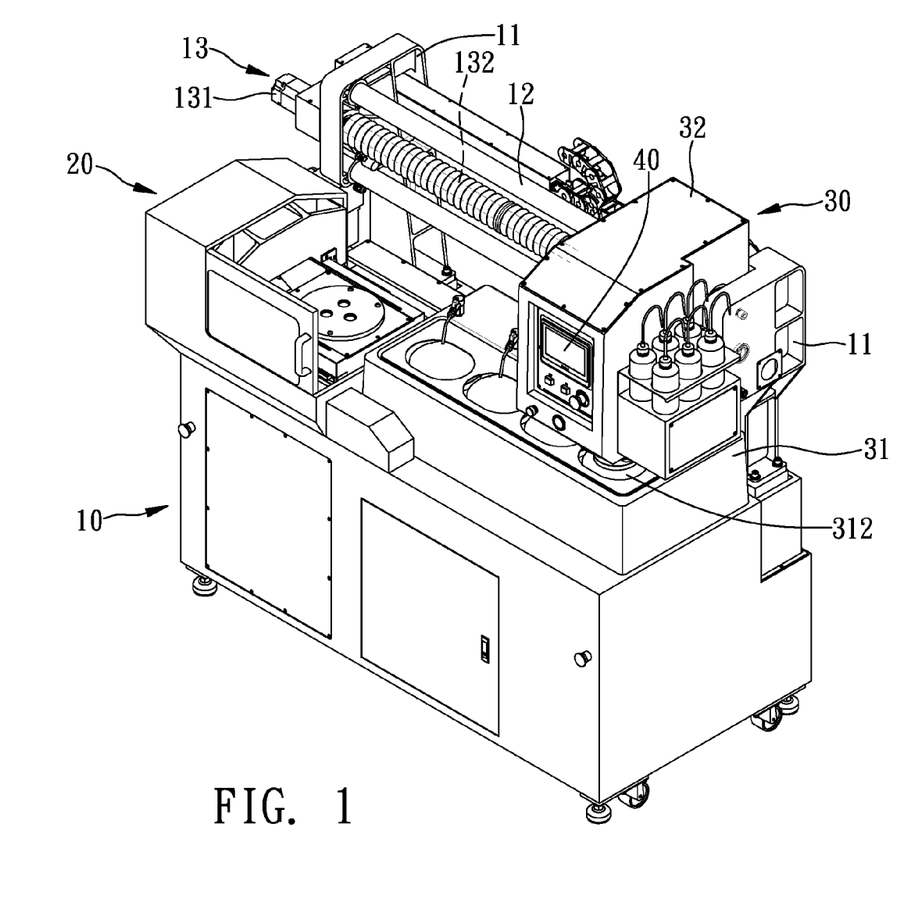
FIG. 1 is a perspective view of a processing machine processing machine in accordance with the present invention.

Referring to the drawings and initially to FIG. 1, a processing machine in accordance with the present invention comprises main frame (10), a mounting press unit (20) mounted on the main frame (10), a grind unit (30) mounted on the main frame (10) and a control unit (40) mounted on the grind unit (30), wherein the mounting press unit (20) and the grind unit (30) are respectively electrically connected to the control unit (40).

Figure 2:
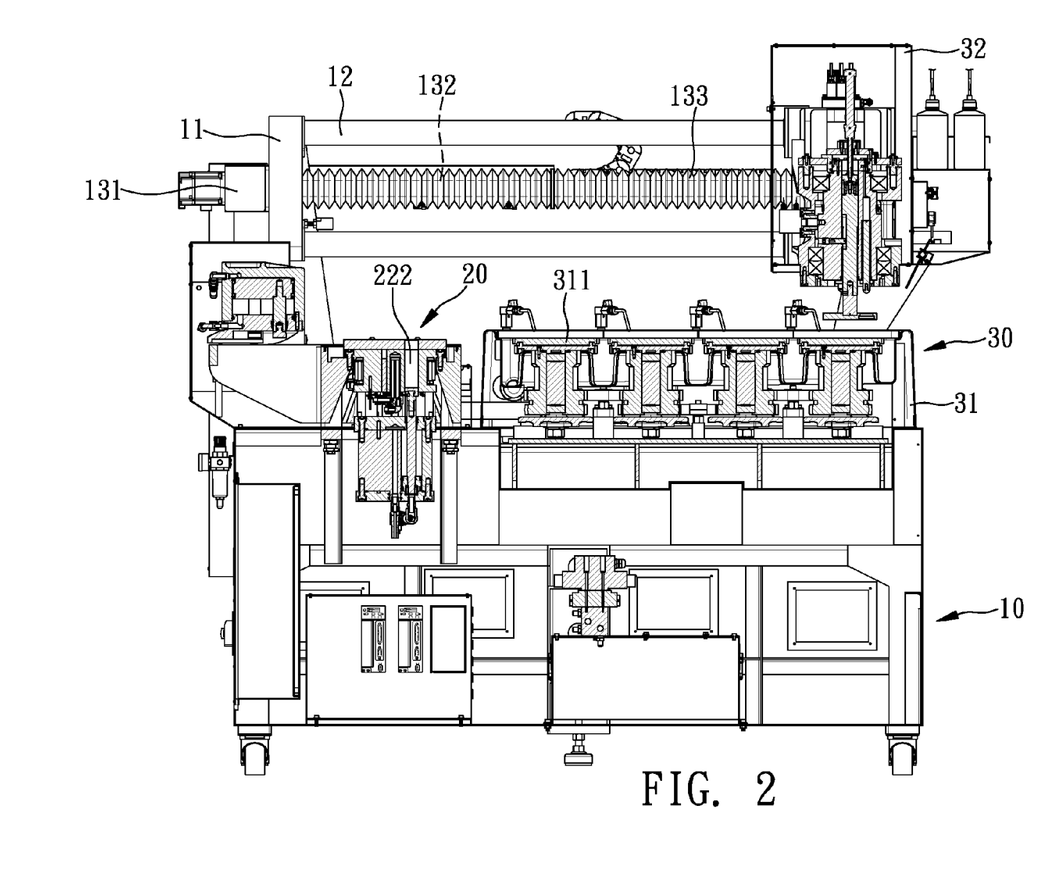
FIG. 2 is a cross-sectional view of the process machine in FIG. 1.

With reference to FIGS. 1 and 2, the main frame (10) includes two stands (11) respectively mounted on two opposite ends thereof. At least one shaft (12) and a drive device (13) are horizontally mounted between the two stands (11). The drive device (13) includes a motor (131) mounted onto a corresponding one of the two stands (11) and a screwed rod (132) longitudinally connected to the motor (131). An extendable tube (133) is longitudinally sleeved on the screwed rod (132) to prevent dust from adhering on the screwed rod (132).

Figure 3:
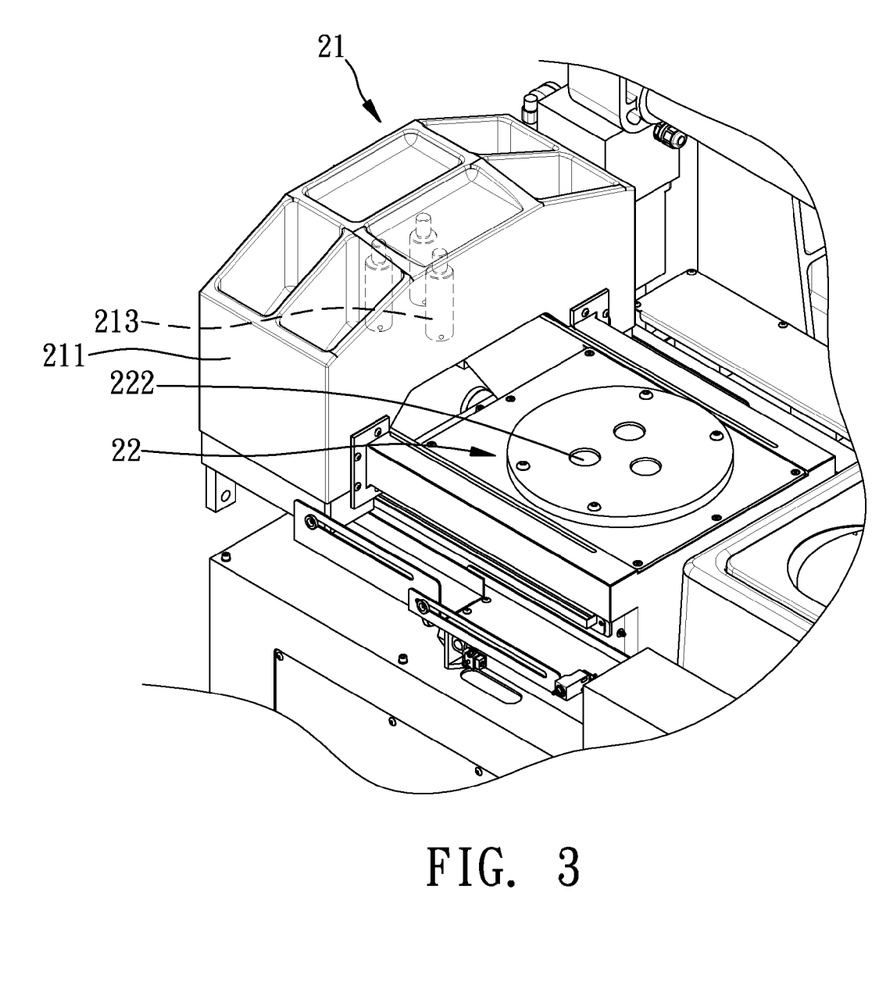
FIG. 3 is a perspective view of a mounting press unit of the processing machine in accordance with the present invention.
Figure 4:
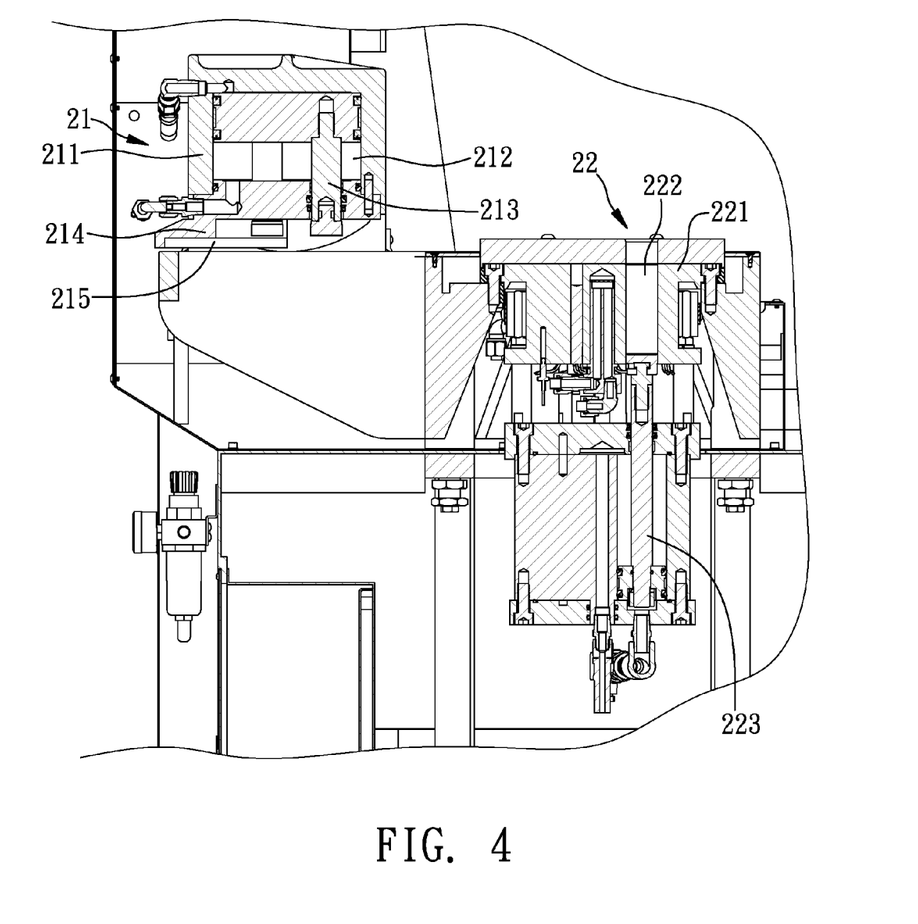
FIG. 4 is a cross-sectional view of the mounting press unit in FIG. 3.

With reference to FIG. 2 through FIG. 4, the mounting press unit (20) includes a pressure provider (21) slidably mounted on the main frame (10) and a shaping apparatus (22) secured on the main frame (10) and laterally corresponding to the grind unit (30). The pressure provider (21) includes a slider (211) slidably mounted on the main frame (10). The slider (211) is reciprocally moved relative to the shaping apparatus (22) and has an inverted U-shape. A seat (212) is secured on an underside of the slider (211) and multiple pistons (213) is movably mounted onto an underside of the seat (212). A stopper (214) is secured on the underside of the seat (212). The stopper (214) has a recess (215) defined in an underside of the stopper (214) and complementally corresponding to the shaping apparatus (22). The shaping apparatus (22) includes a mold (221) mounted into the main frame (10), wherein the mold (221) sequentially provides functions of heating and cooling to the forming sample during mounting press. The mold (221) is convex relative to the main frame (10) and has a periphery complementally corresponding to the recess (215). The mold (221) has multiple die cavity (222) longitudinally defined therein, wherein the die cavities (222) are equally arranged in the mold (221). Each die cavity (222) co-axially aligns with a corresponding one of the pistons (213) of the pressure provider (21) when the top of the mold (221) is partially and complementally received in the recess (215). As a result, each piston (213) of the pressure provider (21) can extend into the corresponding die cavity (222) to provide a high pressure to the powder material in the die cavities (222) for shaping. A piston (223) is movably mounted into a lower portion of each of the die cavities (222). The pistons (223) of the shaping apparatus (22) can push the shaped sample and make the shaped sample being exposed to the mold (221).

Figure 5:
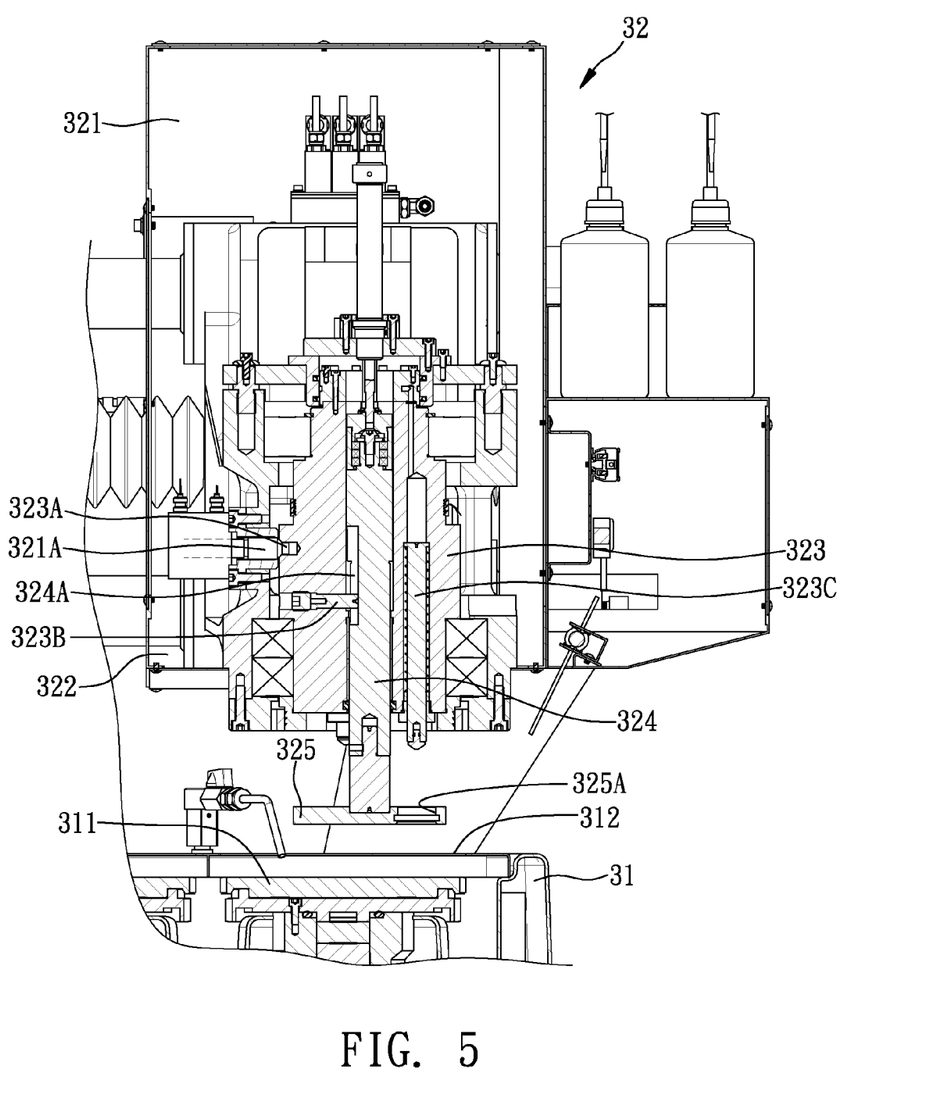
FIG. 5 is a cross-sectional view of a grinding unit of the processing machine in accordance with the present invention.
Figure 6:
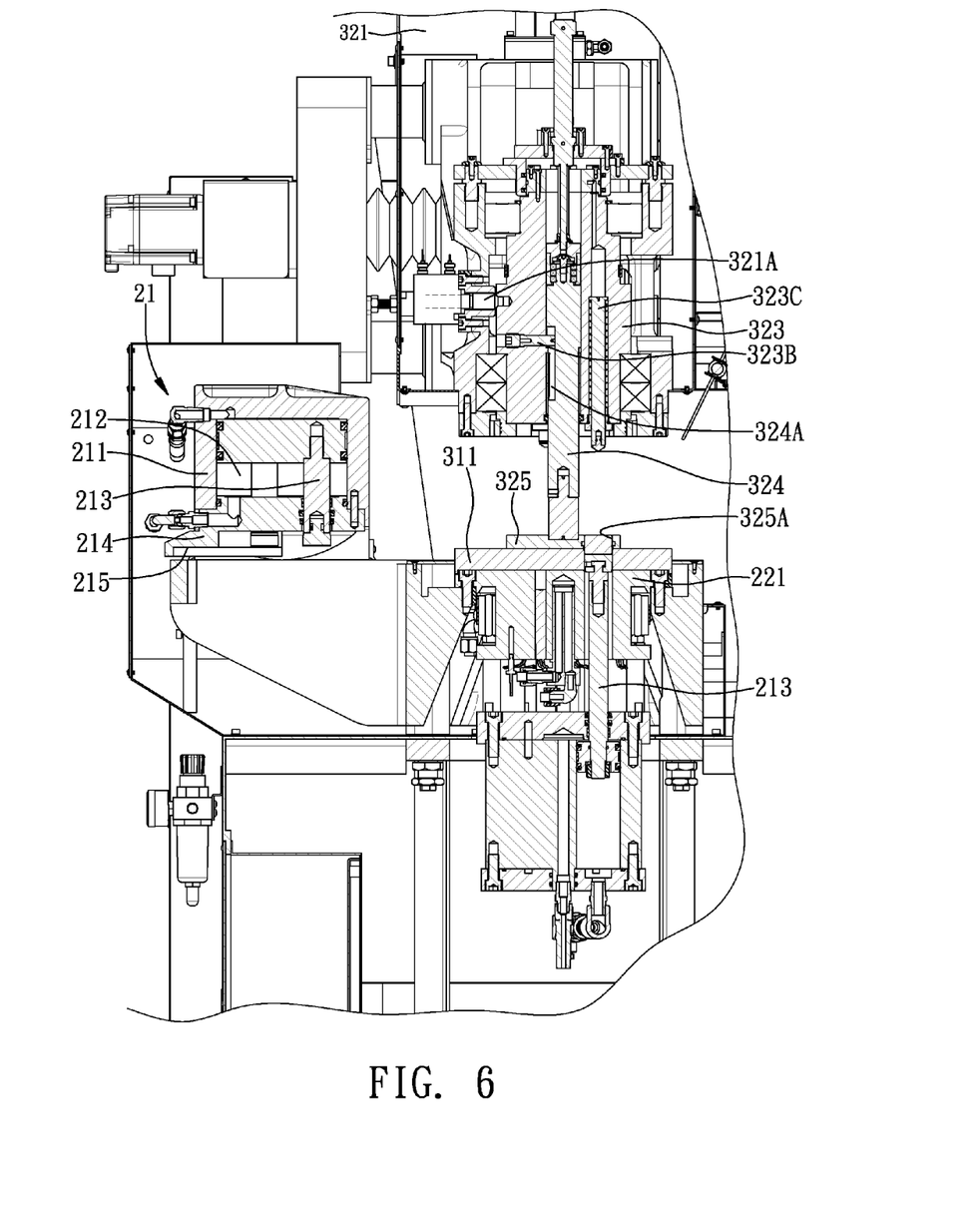
FIG. 6 is a first operational view of the processing machine in accordance with the present invention.
Figure 7:
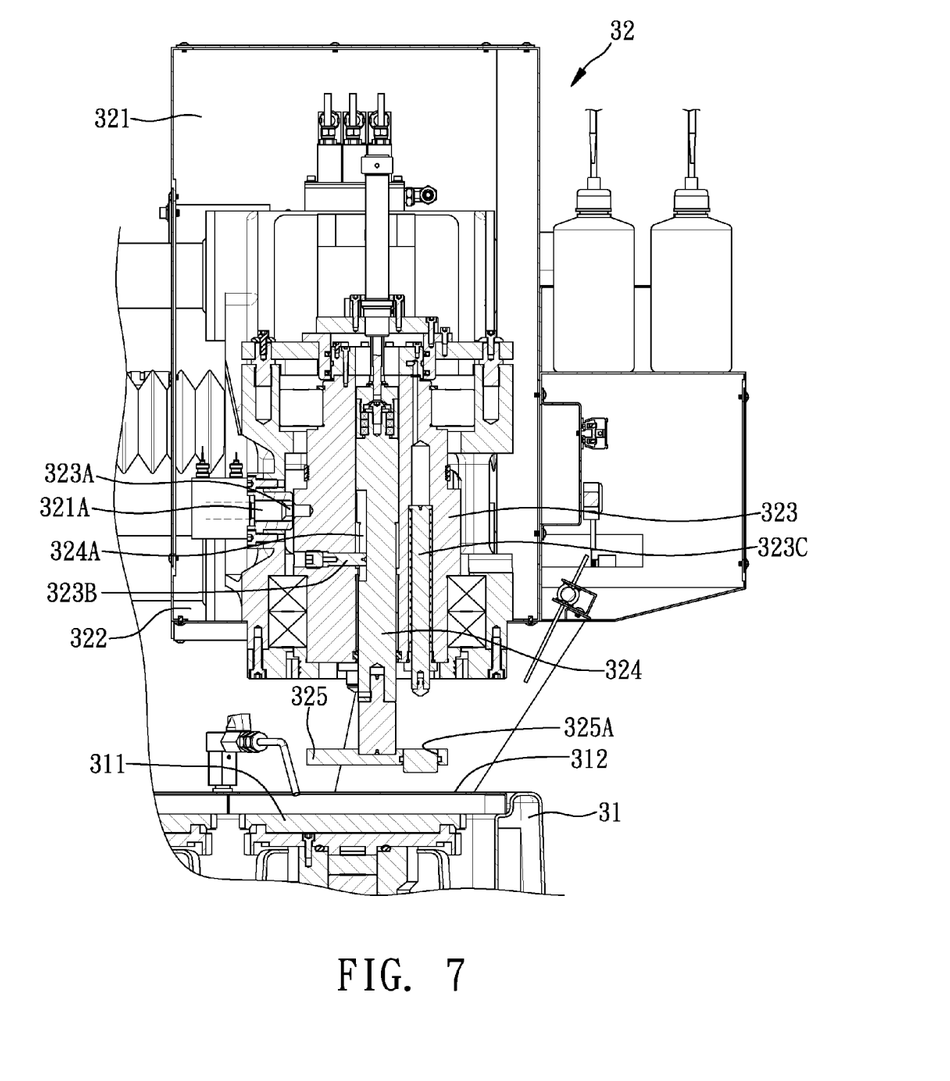
FIG. 7 is a second operational view of the processing machine in accordance with the present invention.
Figure 8:
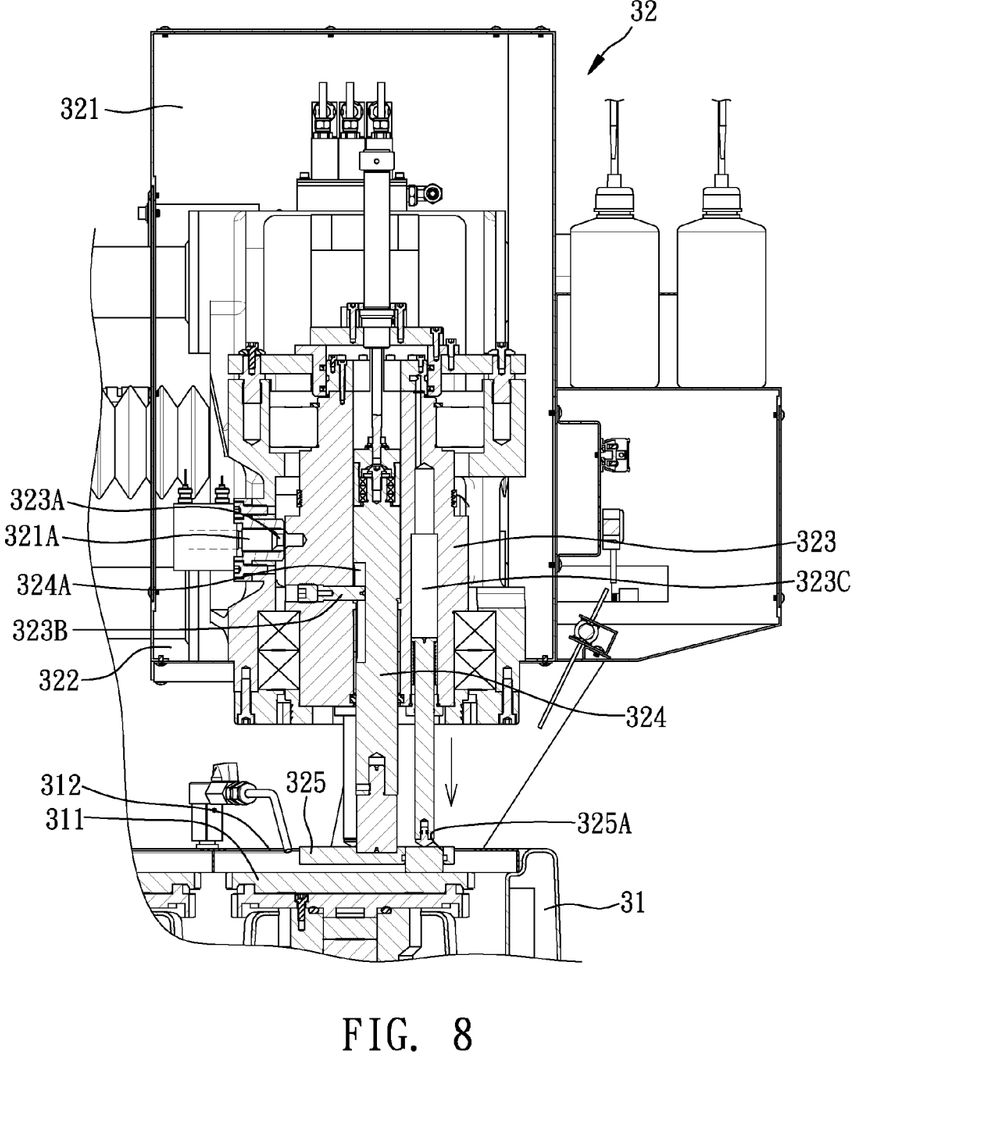
FIG. 8 is a third operational view of the processing machine in accordance with the present invention.

With reference to FIGS. 2 and 5, the grind unit (30) includes a base (31) secured on the main frame (10) and a headstock (32) slidably mounted on the shaft (12). The headstock (32) is connected to the drive device (13) such that the headstock (32) is reciprocally moved on the shaft (12) when the drive device (13) is operated. At least one grinding disc (311) is disposed in the base (31) and at least one opening (312) is defined in a top of the base (31), wherein each opening (312) is concentrically align with a grinding disc (311). In the preferred embodiment of the present invention, there are four grinding discs (311) disposed in the base (31) and the four grinding discs (311) linearly correspond to the mold (221). In addition, the line of centers of the grinding discs (311) and the mold (221) is parallel to the shaft (12). Consequently, the headstock (32) always aligns with a corresponding one of the grinding discs (311) or the mold (221) of the mounting press unit (20) when being moved on the shaft (12). Furthermore, the surface roughnesses of the grinding discs (311) is gradually raised relative to the mold (221) for reduced the operating time of grinding and extending the lifetime of the grinding discs (311). In addition, the grinding discs (311) can be rotated inverted to a rotating direction of the headstock (32) for shortening work-hour.

The headstock (32) includes a housing (321) slidably mounted on the shaft (12). A nut (322) is laterally and securely mounted to the housing (321) and sleeved on the screwed rod (132). The headstock (32) can be reciprocally moved on the shaft (12) due to the relation between the screwed rod (132) and the nut (322) when the screwed rod (132) is rotated by the motor (131). A latch (321A) is slidably and longitudinally mounted to the housing (321).

The headstock (32) includes a rotor (323) rotatably disposed in the housing (321) and a shaft (324) co-axially and movably inserted into the rotor (323), wherein the shaft (324) is synchronously rotated with the rotor (323). A hole (323A) is longitudinally defined in the rotor (323) such that that the rotor (323) can not be rotated relative to the housing (321) when the latch (321A) is partially inserted into the hole (323A). The rotor (323) includes a limiter (323B) radially and movably mounted therein and multiple pistons (323C) longitudinally and slidably mounted into the rotor (323), wherein the pistons (323C) equally surround the shaft (324) of the headstock (32). A groove (324A) is longitudinally defined in the shaft (324) and one end of the limiter (323B) is received in the groove (324A) to limit the moving range of the shaft (324) relative to the rotor (323). A catcher (325) is secured to a free end of the shaft (324). Multiple through holes (325A) are equally defined in the catcher (325), wherein a circle defined by the through holes (325A) is equal to that defined by the die cavities (222) and each through hole (325A) is co-axially align with a corresponding one of the pistons (323C) of the headstock (32). An aspect of each of the through holes (325A) relative to the main frame (10) is equal to that of each of the die cavities (222) relative to the main frame (10) when the rotor (323) is positioned by the latch (321A).

With reference to FIG. 4 through FIG. 8, when the grind unit (30) finishing grinding, the latch (321A) is insert into the hole (323A) to position the rotor (323) and make each through hole (325A) corresponding to a relative one of the die cavities (222). In addition, the shaft (324) of the headstock (32) is upwardly moved to make the catcher (325) fully being separated from the base (31) of the grind unit (30). At the same time, the pressure provider (21) is separated from the mold (221) of the shaping apparatus (22). When operating the processing machine in accordance with the present invention, the operator must install the parameters of all the processes into the control unit (40). For example, the parameter of the distance between the top of the piston (223) of the shaping apparatus (22) and the opening of the die cavity (222) is provided to decide the volume of the shaped sample. The operate time of the pressure provider (21) to the material in each die cavity (222), the move timing of the headstock (32) and the operate time of the grind discs (311) are adjusted relative to the material property.

After installing the parameters, each die cavities (222) is filled with powder material and the control unit (40) is operated to start the processing machine in accordance with the present invention. The slider (211) with the seat (212) and the piston (213) is moved toward the mold (221) of the shaping apparatus (22). The slider (211) is stopped and each piston (213) of the pressure provider (21) is downward moved to press the powder material in the corresponding die cavity (222) when the top portion of the mold (221) is complementally and partially received in the recess (215). At the same time, the shaping apparatus (22) heats the powder material in the die cavities (222) during being shaped. When finishing shaping process, the pressure provider (21) is moved to its original position. The mold (221) of the shaping apparatus (22) cools the shaped samples in the die cavities (222). The pistons (223) upwardly push the cooled samples and make the samples exposed to the mold (221). Next, the drive device (30) is operated and make the headstock (32) moved toward the mold (221) due to the relation between the screwed rod (132) and the nut (322). The drive device (13) is stopped when each through hole (325A) co-axially aligns with a corresponding one of the die cavities (222). The shaft (324) of the headstock (32) is downward moved to make the catcher (325) catching all the samples and the shaft (324) is upward moved to its original position after the catcher (325) securely catching all the samples. Next, the motor (131) of the drive device (13) reversely rotates the screwed rod (132) to make the headstock (32) moved toward the base (31) of the grind unit (30) and make the catcher (325) align with a corresponding one of the grinding disc (311). Next, the latch (321A) is backward moved and separated from the rotor (323) to make the rotor (323) in a free condition. Next, the shaft (324) is rotated with the rotor (323) and downward moved to grind the samples on the corresponding grinding disc (311) relative to the parameter that is previously installed into the control unit (40). Furthermore, each piston (323C) extends to abut against a corresponding one of the samples and hold the samples in place during grinding for promoting grinding quality and effect.

The processing machine in accordance with the present invention combines the functions of mounting press and grinding such that the previous operations of metallographic analysis are greatly simplified and the operator does not needs to guard processing machine in accordance with the present invention.

Although the invention has been explained in relation to its preferred embodiment, it is to be understood that many other possible modifications and variations can be made without departing from the spirit and scope of the invention as hereinafter claimed.

What is claimed is:

1. A processing machine that combines the functions of pressing of a powder to form therefrom a workpiece and grinding the workpiece and comprises:

a main frame including two stands respectively mounted on two opposite ends thereof, at least one shaft and a drive device mounted between the two stands;

a mounting press unit for performing the pressing, mounted on the main frame;

a grind unit for performing the grinding, mounted on the main frame, the grind unit including a base secured on the main frame, the grind unit arranged in a line with the mounting press unit, which line extends parallel to a longitudinal axis of the at least one shaft, the grind unit including a headstock slidably mounted on the at least one shaft and connected to the drive device such that the headstock is reciprocally moved on the at least one shaft to selectively vertically align with the base of the grind unit and with the mounting press unit when the drive device is operated; and a control unit disposed in the grind unit, wherein the mounting press unit and the grind unit are respectively electrically connected to the control unit.

2. The processing machine as claimed in claim 1, wherein mounting press unit includes a pressure provider slidably mounted on the main frame and a shaping apparatus secured on the main frame, the pressure provider including a slider slidably mounted on the main frame, the slider reciprocally moved relative to the shaping apparatus and having an inverted U-shape, the pressure provider further comprising a seat secured on an underside of the slider and multiple pistons movably mounted onto an underside of the seat, a stopper secured on the underside of the seat, the stopper having a recess defined in an underside thereof and having a shape complementally corresponding to a shape of the shaping apparatus, the shaping apparatus including a mold mounted into the main frame, wherein the mold sequentially provides functions of heating and cooling to the powder during the pressing, the mold being convex relative to the main frame and having a periphery complementally corresponding to the recess.

3. The processing machine as claimed in claim 2, wherein the mold has multiple die cavities defined therein, each having a respective longitudinal axis, and the die cavities are spaced about a center of the mold, the longitudinal axis of each respective die cavity co-axially aligns with a longitudinal axis of a corresponding one of the pistons of the pressure provider when the top of the mold is partially and complementally received in the recess, such that each piston of the pressure provider can extend into the corresponding die cavity to provide pressure to the powder material in the die cavities for shaping the workpiece, and wherein a respective piston is movably mounted into a lower portion of each of the die cavities, the pistons of the pressure provider and of the lower portions of the die cavities push the powder and, with the mold, make the pressed workpiece.

4. The processing machine as claimed in claim 2, wherein the grind unit includes at least one grinding disc disposed in the base thereof, and the grind unit also includes at least one opening defined in a top of the base of the grind unit, the at least one opening concentrically aligns with the at least one grinding disc, the at least one grinding disc having a respective center, each respective center of each of the at least one grinding disc arranged along the line, wherein the mold is also arranged along the line.

5. The processing machine as claimed in claim 4, wherein the drive device includes a motor mounted onto a corresponding one of the two stands and a screwed rod connected to the motor, and the headstock includes a housing slidably mounted on the shaft, and the drive device also includes a nut securely mounted to the housing and sleeved on the screwed rod such that the headstock is reciprocally moved on the shaft due to the relation between the screwed rod and the nut when the screwed rod is rotated by the motor.

6. The processing machine as claimed in claim 5, wherein the headstock includes a rotor rotatably disposed in the housing, wherein the headstock also includes a shaft within the rotor, wherein the shaft of the headstock is synchronously rotated with the rotor, wherein a hole is defined in the rotor, and wherein a latch is slidably mounted to the housing such that that the rotor cannot be rotated relative to the housing when the latch is partially inserted into the hole.

7. The processing machine as claimed in claim 6, wherein the rotor includes a limiter that has a longitudinal axis that extends radially with respect to a rotation axis of the rotor, wherein the limiter is movably mounted in the rotor, and wherein multiple pistons are slidably mounted into the rotor, the pistons are spaced about the shaft of the headstock so as to surround the shaft of the headstock, and wherein a groove is defined in the shaft of the headstock, and wherein one end of the limiter is received in the groove to limit the moving range of the shaft of the headstock relative to the rotor.

8. The processing machine as claimed in claim 7, wherein the headstock includes a catcher secured to a free end of the shaft of the headstock, and wherein multiple through holes are defined in the catcher, a size of a circle defined by the through holes equal to that of a circle defined by die cavities of the mold, and wherein each through hole of the catcher is able to vertically align with a corresponding one of pistons of the headstock.

9. The processing machine as claimed in claim 6, wherein the headstock includes a catcher secured to a free end of the shaft of the headstock, and wherein multiple through holes are defined in the catcher, a size of a circle defined by the through holes equal to that of a circle defined by die cavities of the mold, and wherein each through hole of the catcher is able to vertically align with a corresponding one of pistons of the headstock.

10. The processing machine as claimed in claim 1, wherein the grind unit includes at least one grinding disc disposed in the base thereof, and the grind unit also includes at least one opening defined in a top of the base of the grind unit, the at least one opening concentrically aligns with the at least one grinding disc, the at least one grinding disc having a respective center, each respective center of each of the at least one grinding disc arranged along the line, wherein a mold of the mounting press unit is also arranged along the line.

11. The processing machine as claimed in claim 10, wherein the drive device includes a motor mounted onto a corresponding one of the two stands and a screwed rod connected to the motor, and the headstock includes a housing slidably mounted on the shaft, and the drive device also includes a nut securely mounted to the housing and sleeved on the screwed rod such that the headstock is reciprocally moved on the shaft due to the relation between the screwed rod and the nut when the screwed rod is rotated by the motor.

12. The processing machine as claimed in claim 11, wherein the headstock includes a rotor rotatably disposed in the housing, wherein the headstock also includes a shaft within the rotor, wherein the shaft of the headstock is synchronously rotated with the rotor, wherein a hole is defined in the rotor, and wherein a latch is slidably mounted to the housing such that that the rotor cannot be rotated relative to the housing when the latch is partially inserted into the hole.

13. The processing machine as claimed in claim 12, wherein the rotor includes a limiter that has a longitudinal axis that extends radially with respect to a rotation axis of the rotor, wherein the limiter is movably mounted in the rotor, and wherein multiple pistons are slidably mounted into the rotor, the pistons are spaced about the shaft of the headstock so as to surround the shaft of the headstock, and wherein a groove is defined in the shaft of the headstock, and wherein one end of the limiter is received in the groove to limit the moving range of the shaft of the headstock relative to the rotor.

14. The processing machine as claimed in claim 13, wherein the headstock includes a catcher secured to a free end of the shaft of the headstock, and wherein multiple through holes are defined in the catcher, a size of a circle defined by the through holes equal to that of a circle defined by die cavities of the mounting press unit, and wherein each through hole of the catcher is able to vertically align with a corresponding one of the multiple pistons of the rotor.

15. The processing machine as claimed in claim 12, wherein the headstock includes a catcher secured to a free end of the shaft of the headstock, and wherein multiple through holes are defined in the catcher, a size of a circle defined by the through holes equal to that of a circle defined by die cavities of the mounting press unit, and wherein each through hole of the catcher is able to vertically align with a corresponding one of pistons of the headstock.

* * * * *